United States Patent
Schliwa et al.

(10) Patent No.: US 12,497,171 B2
(45) Date of Patent: Dec. 16, 2025

(54) SYSTEM CONSISTING OF CATCH ELEMENTS AND FREIGHT CARRIERS

(71) Applicant: Airbus Operations GmbH, Hamburg (DE)

(72) Inventors: Ralf Schliwa, Hamburg (DE); Dirk Meiranke, Hamburg (DE); Thomas Grabow, Hamburg (DE); Fred Schettel, Hamburg (DE); Hermann Benthien, Hamburg (DE); Carsten Petzholtz, Hamburg (DE); Andreas Poppe, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 813 days.

(21) Appl. No.: 17/719,012

(22) Filed: Apr. 12, 2022

(65) Prior Publication Data
US 2022/0324574 A1    Oct. 13, 2022

(30) Foreign Application Priority Data
Apr. 13, 2021    (DE) .................... 10 2021 109 257.4

(51) Int. Cl.
*B64D 9/00*    (2006.01)
*B60P 7/13*    (2006.01)
*B64C 1/20*    (2006.01)

(52) U.S. Cl.
CPC .............. *B64D 9/003* (2013.01); *B60P 7/13* (2013.01); *B64C 1/20* (2013.01)

(58) Field of Classification Search
CPC .............. B64D 9/003; B64D 2009/006; B64D 2011/0092; B64F 1/322; B60P 7/13; B64C 1/20
(Continued)

(56) References Cited

U.S. PATENT DOCUMENTS

| | | | |
|---|---|---|---|
| 5,865,579 A | * | 2/1999 | Thomas .................... B60P 7/10 414/532 |
| 10,220,868 B1 | | 3/2019 | Clos et al. |

(Continued)

FOREIGN PATENT DOCUMENTS

| | | | |
|---|---|---|---|
| CA | 2985289 A1 | * 7/2018 | ............... B64D 9/00 |
| EP | 3006329 A1 | 4/2016 | |

OTHER PUBLICATIONS

Chinese Office Action in CN Application No. 202210379850.1 dated Feb. 27, 2025, 6 pages.

*Primary Examiner* — Daniel J Colilla
(74) *Attorney, Agent, or Firm* — KDW Firm PLLC

(57) ABSTRACT

A system includes a freight carrier, front catch element and rear catch element, the front edge of the base element of the freight carrier having front engagement elements, and the rear edge has rear engagement elements. The front catch element has front floor engagement devices to engage locking elements so movement of the front catch element in the floor surface plane and perpendicular thereto is prevented. The front catch element has front engagement devices to engage the front engagement elements. The rear catch element has rear floor engagement devices to engage locking elements in rails so movement of the rear catch element in the floor surface plane and perpendicularly thereto is prevented. The rear catch element has rear engagement devices to engage the rear engagement elements so movement of the rear catch element relative to the base element parallel to the plane of the supporting surface and perpendicular to the plane towards the supporting surface is prevented.

14 Claims, 6 Drawing Sheets

(58) Field of Classification Search
USPC .......................................................... 410/52
See application file for complete search history.

(56) References Cited

U.S. PATENT DOCUMENTS

2015/0274358 A1* 10/2015 Hidalgo ............. B65D 19/0095
108/56.3
2016/0244186 A1* 8/2016 Brown ..................... B64D 9/00

* cited by examiner

SYSTEM CONSISTING OF CATCH ELEMENTS AND FREIGHT CARRIERS

CROSS-REFERENCE TO RELATED APPLICATION

This application claims priority to German patent application DE 10 2021 109 257.4 filed Apr. 13, 2021, the entire disclosure of which is incorporated by reference herein.

TECHNICAL FIELD

The disclosure herein relates to a system with a freight carrier, a front catch element and a rear catch element.

BACKGROUND

It is known from the prior art that conventional aircraft firstly have a hold in which freight containers or else loose luggage can be accommodated, wherein a freight loading system can be provided in the hold, making it possible to convey the freight containers or the loose luggage to a desired position inside the hold. Such a freight loading system is known, for example, from EP 3 006 329 B1, wherein, in the case of the system proposed there, carrier elements are mounted displaceably on the floor surface of the hold such that freight carriers can be placed on the carrier elements and displaced inside the hold.

However, it has now turned out that, due to greatly fluctuating passenger numbers, it is desirable also to be able to use the passenger cabin more flexibly and in particular to enable freight to also be accommodated there without a large outlay being required for the conversion so that the freight carriers can be accommodated there. In particular, it is intended to be rapidly possible without lengthy delays to convert the passenger cabin in such a manner that the freight carriers can be accommodated.

In conjunction with the disclosure herein, the term "freight carrier" is used both for freight containers having a closed covering and for platforms, on the upper side or supporting surface of which freight elements can be arranged or fastened without the freight carrier having a covering surrounding the freight elements.

Since such freight carriers are comparatively heavy and have a center of gravity which is arranged at a vertical distance from the floor surface of the cabin, it also has to be ensured, when accommodating freight carriers in the passenger cabin of an aircraft, that the freight carriers can be connected to the structure of the aircraft in such a manner that the forces occurring during take-offs and landings are suitably introduced into the structure. In particular, the fastening of the freight carriers has to be configured in such a manner that the freight carriers are accommodated such that the forces and torques arising from the high weight are reliably absorbed under all circumstances by the structure.

In addition, the freight carriers have to be arranged in the passenger cabin in such a manner that they are easily accessible in particular via the aisles which are present, and therefore, in the event of a fire, a freight carrier can easily be extinguished.

Furthermore, the freight carriers and the passenger cabin are intended to be configured in such a manner that the freight carriers, without additional fixtures being required, can be moved over the floor surface of the passenger cabin in order to arrive at the position which they are intended to take up during the flight. In particular, it is intended to dispense with the necessity of a special freight loading system having to be installed in the passenger cabin in order to move the freight carriers.

SUMMARY

Starting from the prior art, it is therefore an object of the disclosure herein to provide a freight carrier and in particular a system consisting of freight carriers, which enable the freight carrier to be connected without a large installation outlay to the floor surface as standard in an aircraft, preferably to the floor surface of the passenger cabin, in such a manner that the loads which occur are introduced into the structure of the aircraft.

According to the disclosure herein, this object is achieved by a system consisting of a freight carrier and at least one front and at least one rear catch element.

According to the disclosure herein, the freight carrier has a base element which has a supporting surface, which is configured to rest on a floor surface in the interior of an aircraft, in particular on a floor surface of a passenger cabin of an aircraft, and which has a front edge and a rear edge opposite the front edge, wherein the supporting surface has structure to move the freight carrier over the floor surface, wherein the base element has a main surface which is arranged on the base element in such a manner that the main surface faces away from the supporting surface, and is configured in such a manner that freight elements can be accommodated thereon, wherein the front edge of the base element has front engagement elements, and wherein the rear edge has rear engagement elements.

According to the disclosure herein, the front catch element is configured to extend along the front edge of the base element and has front floor engagement devices which are configured to engage with locking elements in rails in the floor surface of the interior, and preferably in the floor surface of the passenger cabin, in such a manner that a movement of the front catch element in the plane of the floor surface and perpendicular thereto is prevented, wherein the front catch element has front engagement devices which are configured to engage with the front engagement elements in such a manner that a movement of the front catch element relative to the base element parallel to the plane of the supporting surface and perpendicular to the plane towards the supporting surface is prevented.

Finally, according to the disclosure herein, the rear catch element is configured to extend along the rear edge of the base element and has rear floor engagement devices which are configured to engage with locking elements in rails in the floor surface of the interior, and preferably in the floor surface of the passenger cabin, in such a manner that a movement of the rear catch element in the plane of the floor surface and perpendicular thereto is prevented, wherein the rear catch element has rear engagement devices which are configured to engage with the rear engagement elements in such a manner that a movement of the rear catch element relative to the base element parallel to the plane of the supporting surface and perpendicular to the plane towards the supporting surface is prevented.

Accordingly, the system according to the disclosure herein comprises at least one freight carrier and front and rear catch elements. The freight carrier is configured according to the disclosure herein in such a manner that it comprises a base element which has a supporting surface, which is configured to rest on the floor surface of the interior of the aircraft, and in particular on the floor surface of the passenger cabin of an aircraft, wherein structure is provided in the supporting surface that enable the freight carrier to move with little resistance over the floor surface. This can be, for example, wheels or sliding elements, wherein both can protrude over the plane of the supporting surface.

Furthermore, the base element of the freight carrier of the system according to the disclosure herein has a main surface which is opposite the supporting surface and which is configured to accommodate freight elements, wherein the freight elements may firstly be items of luggage but secondly also relatively large components. In particular, the disclosure herein is not restricted to the use of the freight carriers for luggage, but rather the freight carriers can be configured to be able to accommodate any type of freight element.

The base element of the freight carrier of the system according to the disclosure herein also has a front edge and a rear edge which is opposite the front edge and preferably runs parallel thereto, wherein the freight carrier is preferably configured to be rectangular. According to the disclosure herein, front engagement elements are provided on the front edge, while the rear edge is provided with rear engagement elements. These engagement elements serve to be able to bring the freight carrier releasably into engagement with the front and the rear catch element, wherein the catch elements then serve to fasten the freight carrier to rails provided in the floor surface.

In particular, the front catch element of the system according to the disclosure herein is configured in such a manner that it can extend along the front edge of the base element of the freight carrier, wherein then the front engagement elements provided on the base element engage with front input devices on the front catch element. The engagement elements and input devices are configured here in such a manner that they prevent a relative movement between the base element and the front catch element parallel to the plane of the supporting surface and perpendicular thereto. In particular, the connection between the engagement elements and the input devices is configured in such a manner that, whenever both rest on the supporting surface, the base element cannot be moved away from the supporting surface perpendicularly thereto.

Furthermore, the front catch element is provided with floor engagement devices which permit the front catch element to be fixedly connected in such a manner to rails provided in the floor surface and preferably running in the longitudinal direction of the interior and in particular of the passenger cabin that the catch element cannot be moved away from the floor surface perpendicular thereto and that a displacement movement along the rails and overall in the plane of the supporting surface is prevented.

By this configuration of the front catch element and of the engagement elements and input devices, the front edge of the base element and therefore of the freight carrier is fixedly connected to the rails and, via the latter, to the structure of the aircraft.

According to the disclosure herein, the rear catch element is configured entirely analogously to the front catch element and can extend along the rear edge of the base element, wherein it has rear floor engagement devices which can engage with the rails of the floor surface in such a manner that, whenever this engagement is present, the rear catch element cannot be moved away perpendicular to the supporting surface and also cannot be displaced parallel to the plane of the supporting surface. The rear catch element has rear engagement devices which can engage with the rear engagement elements on the base element in such a manner that, whenever the rear catch element and the base element or the freight carrier rest on the supporting surface and the rear engagement elements and input devices are in engagement with one another, a movement of the freight carrier parallel to the plane of the supporting surface and away upwards perpendicular thereto is not possible.

In this way, the effect achieved by the rear catch element is that the rear edge or the rear end of the freight carrier is also fixedly connected to the rails and therefore forces and torques which are produced at the freight carrier by accelerations occurring during the flight are introduced directly via the rails into the structure of the aircraft.

In the case of the system according to the disclosure herein, it is therefore possible in a simple manner to first of all move the freight carriers without auxiliary means to the desired position inside the interior, or in the passenger cabin, using the structure provided on the supporting surface for moving the freight carrier. Subsequently, with the aid of the catch elements and the rails provided in the floor surface, the freight carrier can be locked in relation to the rails and therefore fastened thereto. The front and rear engagement elements and engagement devices, which in particular prevent a movement of the base element or of the freight carrier upwards away from the floor surface, make it possible for torques which act in this direction and which arise when accelerations act on the freight carrier in particular during the take-off and landing phase to be introduced into the structure of the aircraft. In addition, the catch elements extending along the front edge and the rear edge also ensure that the freight carrier or the base element thereof cannot be displaced on the floor surface of the interior, or of the passenger cabin of the aircraft.

The installation of the catch elements is simple here, and therefore the outlay on loading the interior of the aircraft and in particular of the passenger cabin is low.

Since the catch elements engage with the rails present in the floor surface, it is unnecessary, for the fastening of the freight carriers, to provide additional fastening elements which are connected to the structure of the aircraft; rather, recourse can be made to the rails which are already present. In particular, the rails to which the catch elements are connected may be the same rails to which the seats of the passenger cabin are also fastened.

It is particularly preferred here if the front and rear floor engagement devices are configured in such a manner that they can engage with locking elements which are arranged in at least two rails extending parallel to one another in the floor surface.

In a furthermore preferred manner, the front and rear floor engagement devices can be configured in such a manner that they can engage with locking elements which are arranged in at least two rails extending parallel to one another in the floor surface. It is particularly preferred here if the locking elements have locking bolts which protrude over the floor surface, wherein the front and the rear catch element have bores for receiving the locking bolts.

If, furthermore, the front and the rear floor engagement devices are configured in such a manner that the front and the rear catch elements are fastenable to the rails in the floor surface of the interior, and preferably in the floor surface of the passenger cabin, in different positions transversely with respect to the rails, the flexibility with which the freight carriers can be arranged in the interior, and preferably in the passenger cabin of the aircraft, is further increased. In particular, it can also be taken into consideration here that, in the case of different types of aircraft, the rails are arranged differently in the floor surface. The effect therefore achieved with this preferred embodiment is that the system can be used in different types of aircraft.

Recourse is therefore preferably made to already existing elements of the passenger cabin in order to directly connect the freight carriers to the structure of the aircraft and to ensure that loads are introduced directly into the structure.

In a preferred embodiment, the front engagement elements are designed as bolts which are displaceable parallel to the plane of the supporting surface in relation to the base element and perpendicular to the front edge such that the bolts can take up a retracted and an extended position, wherein the bolts protrude further over the front edge in the extended position than in the retracted position, and wherein the front engagement devices are designed as front openings which are configured to receive the bolts. Also included here is the fact that, in the retracted position, the bolts do not protrude at all over the front edge, but rather are set back behind it.

In this embodiment, an engagement between the front catch element and the base element can be achieved in a simple manner since only the bolts have to be brought into the extended position in which they then engage with the front openings in the front catch element. This engagement in turn ensures that the base element and therefore the freight carrier can no longer be moved away from the floor surface if it is ensured that the dimensions of the front openings correspond to those of the bolts.

In a further preferred manner, the bolts in the extended position protrude over the front edge to an extent such that they extend through the front catch element and through the front openings thereof in such a manner that they protrude over the front catch element when the front catch element extends along the front edge of the freight carrier. This makes it possible for the bolts not only to be able to engage with the front catch element, when the bolts are in the extended position, but also to be able to enter into engagement with further components arranged in front of the front catch element on the side thereof facing away from the freight carrier.

In this connection, it is furthermore preferred if the rear catch element has rear openings which are configured to receive the bolts when the rear catch element extends along the front catch element on that side of the front catch element which faces away from the freight carrier. In such a refinement, the bolts of a base element of a first freight carrier, in addition to engaging with the front catch element, can thus also engage with a rear catch element which serves to engage with the rear edge of a second freight carrier that is arranged in front of the first freight carrier on the floor surface. In this way, at any rate the first freight carrier, and in particular the front edge thereof, is redundantly secured by a front catch element and a further, rear catch element which is assigned to a further freight carrier.

In order to simplify the engagement between the free end of the bolts, on the one hand, and the front openings of the front catch elements, it is preferred if the free end of the bolts is conical.

In a further preferred embodiment, it is provided that the bolts are coupled to an actuating device which is configured to displace the bolts between the retracted and the extended position, wherein the actuating device has an actuating element which is movable between a first and a second position, and wherein the actuating device is configured in such a manner that, whenever the actuating element is in the first position, the bolts are in the retracted position, and that, whenever the actuating element is in the second position, the bolts are in the extended position. By the provision of such an actuating device with an actuating element which can be moved by operating personnel, the operation of fastening the freight carriers to the floor surface of the interior, or of the passenger cabin, is further simplified. All that is required is first of all to couple the front catch element to the rails in the floor surface, and then the freight carrier can be pushed against the front catch element, and, subsequently, by movement of the actuating element, the bolts are moved into the extended position such that engagement between the catch element and the front edge of the freight carrier is produced.

In a preferred manner, in order to move the freight carrier over the floor surface, the structure comprises wheels which are movable in a direction transversely, preferably perpendicularly, with respect to the supporting surface between a first and a second wheel position, wherein the wheels do not protrude over the supporting surface in the first wheel position and protrude over the supporting surface in the second wheel position. The movability of the wheels perpendicular to the supporting surface makes it possible that, whenever the freight carriers are in the desired position, slight slipping of the freight carriers can be prevented by the wheels being moved into the first wheel position.

In this connection, it is furthermore preferred if the actuating device, with which the bolts are moved between the retracted and the extended position, is furthermore coupled to the wheels in such a manner that it moves the wheels between the first and the second wheel position, wherein the actuating device is configured in such a manner that, whenever the actuating element is in the first position, the wheels are in the second wheel position, and that, whenever the actuating element is in the second position, the wheels are in the first wheel position. It is thereby made possible for the lowering of the freight carrier or of the base element onto the floor surface to be synchronized with the extending of the bolts. This further facilitates the operation.

Furthermore, it is preferred if the rear engagement elements are designed as two rear receiving openings extending perpendicular to the rear edge and parallel to the plane of the supporting surface, wherein the rear engagement device has rear protrusions which are designed to be able to be received in the receiving openings. In such an embodiment, the rear catch elements can simply be brought into engagement with the freight carrier by insertion of the protrusions into the receiving openings in the base element, which permits simple installation of the rear catch elements. In addition, in a further preferred manner, the receiving openings which can be used are the same openings which are also provided for receiving the forks of a forklift truck.

In a preferred embodiment, the front catch element has a multiplicity of bores along a direction which runs parallel to the front edge of the base element when the front engagement elements are in engagement with the front engagement devices, and therefore locking bolts in the rails can engage with the bores in the front catch element. Furthermore, in this preferred embodiment, the rear catch element has a multiplicity of bores along a direction which runs parallel to the rear edge of the base element when the rear engagement elements are in engagement with the rear engagement devices, and therefore locking bolts in the rails can engage with the bores in the rear catch element.

Firstly, the effect achieved with this embodiment is that the catch elements can be fastened to rails which are arranged in the floor surface of the interior in front of and preferably in the passenger cabin of an aircraft, wherein the catch elements can be spaced differently. With this embodiment, it is secondly also made possible for the catch elements to be able to be arranged in positions offset perpendicularly to the rails running in the floor surface of the interior, or in the passenger cabin, and to be able to be fixedly connected in each case to the rails.

Furthermore, the disclosure herein includes the fact that the system according to the disclosure herein and the previously described embodiments thereof are combined with a cabin arrangement of an aircraft, wherein the cabin arrangement has a floor surface in which rails preferably extending parallel to one another and running in the longitudinal direction of the cabin arrangement are provided.

BRIEF DESCRIPTION OF THE DRAWINGS

The disclosure herein is explained below with reference to a drawing in which only preferred example embodiments are reproduced, wherein.

DETAILED DESCRIPTION

Figure 1:
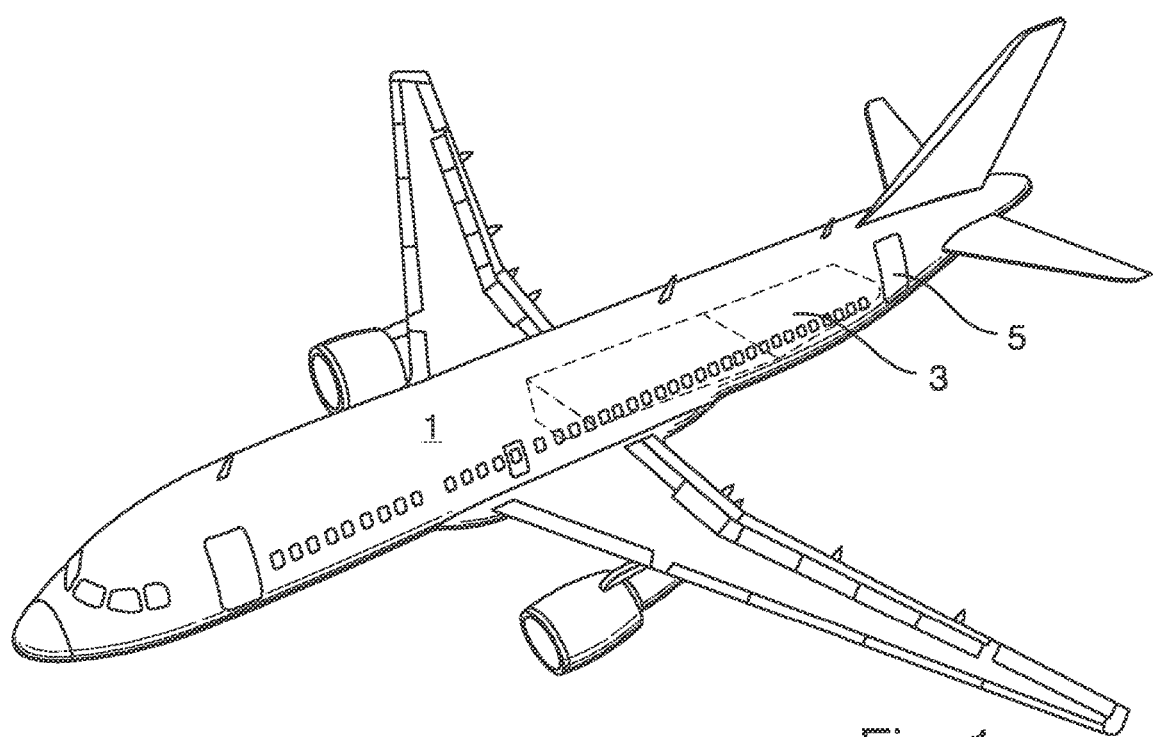
FIG. 1 shows a perspective view of an aircraft, in the interior of which, and in particular in the passenger cabin of which, the example embodiments of the system according to the disclosure herein consisting of freight carriers and catch elements can be accommodated.

FIG. 1 shows an aircraft which, in a conventional manner, has a passenger cabin 1 and a hold 3, wherein the example embodiments described below of freight systems according to the disclosure herein can be accommodated both in the passenger cabin 1 and in the hold 3. However, the use is particularly preferred in which the example embodiments of systems according to the disclosure herein are accommodated in the passenger cabin 1, wherein the cabin doors 5 are used in this case in order to introduce the freight carriers 7 into the passenger cabin 1.

The example embodiments of the systems according to the disclosure herein comprise at least one freight carrier 7 and at least one front catch element and at least one rear catch element. Example embodiments of these elements are described below with reference to the figures.

Figure 2:
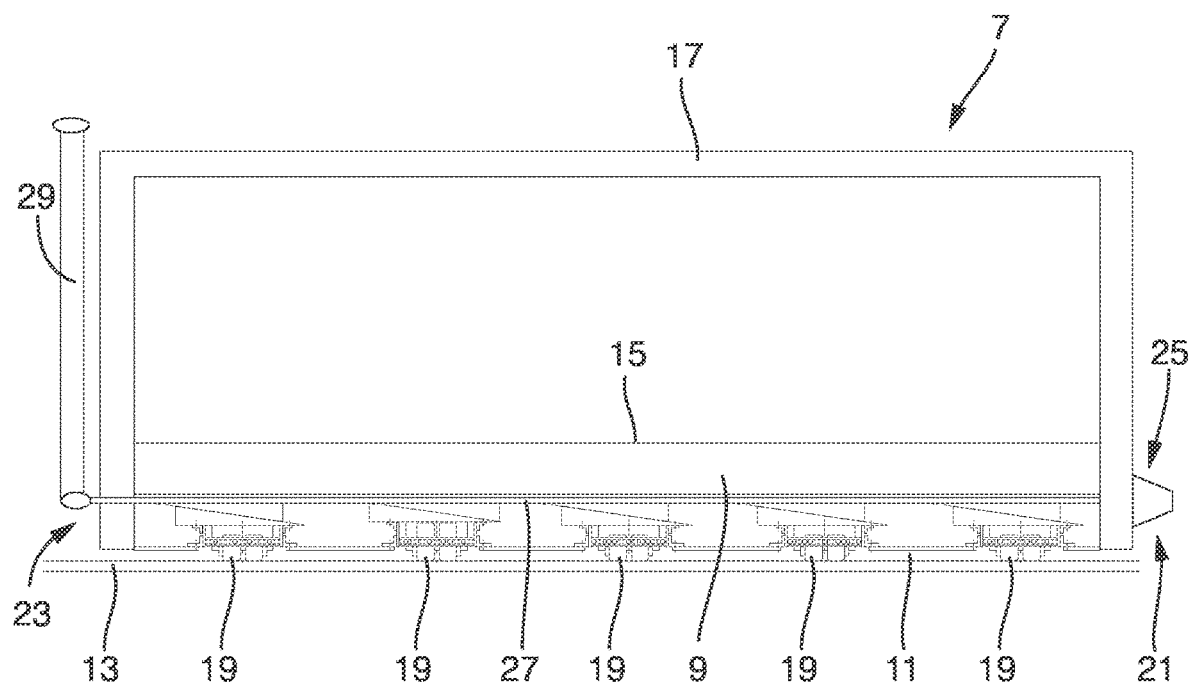
FIG. 2 shows a lateral sectional illustration of a freight carrier of an example embodiment of a system according to the disclosure herein.
Figure 3:
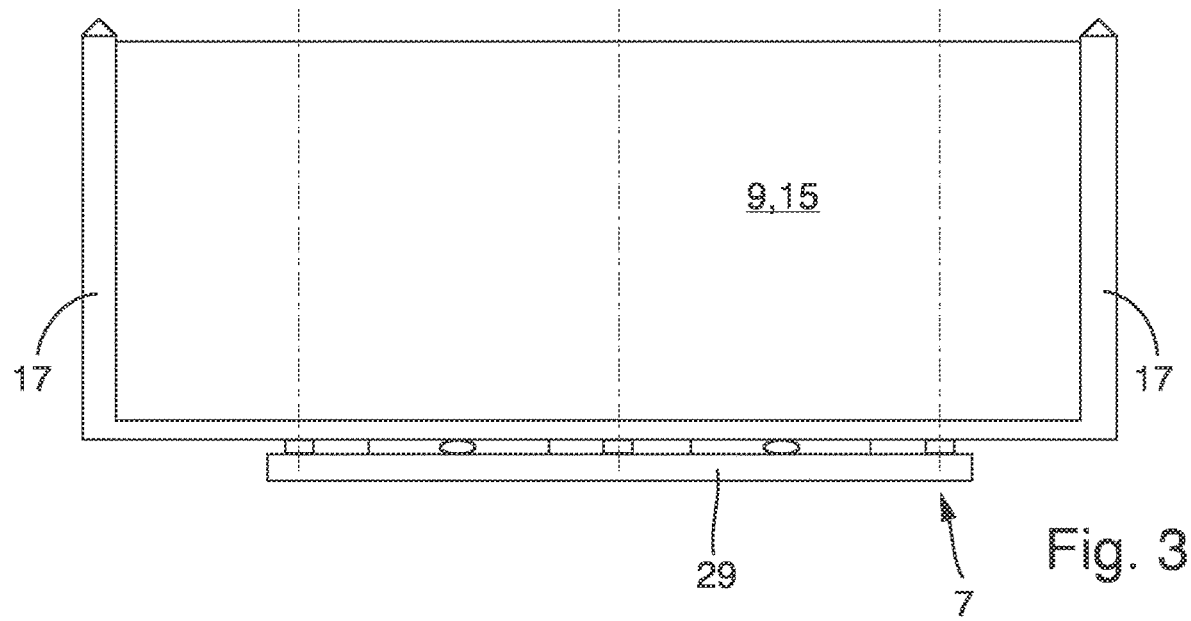
FIG. 3 shows a top view of the freight carrier from FIG. 2, wherein bolts are in a retracted position.
Figure 4:
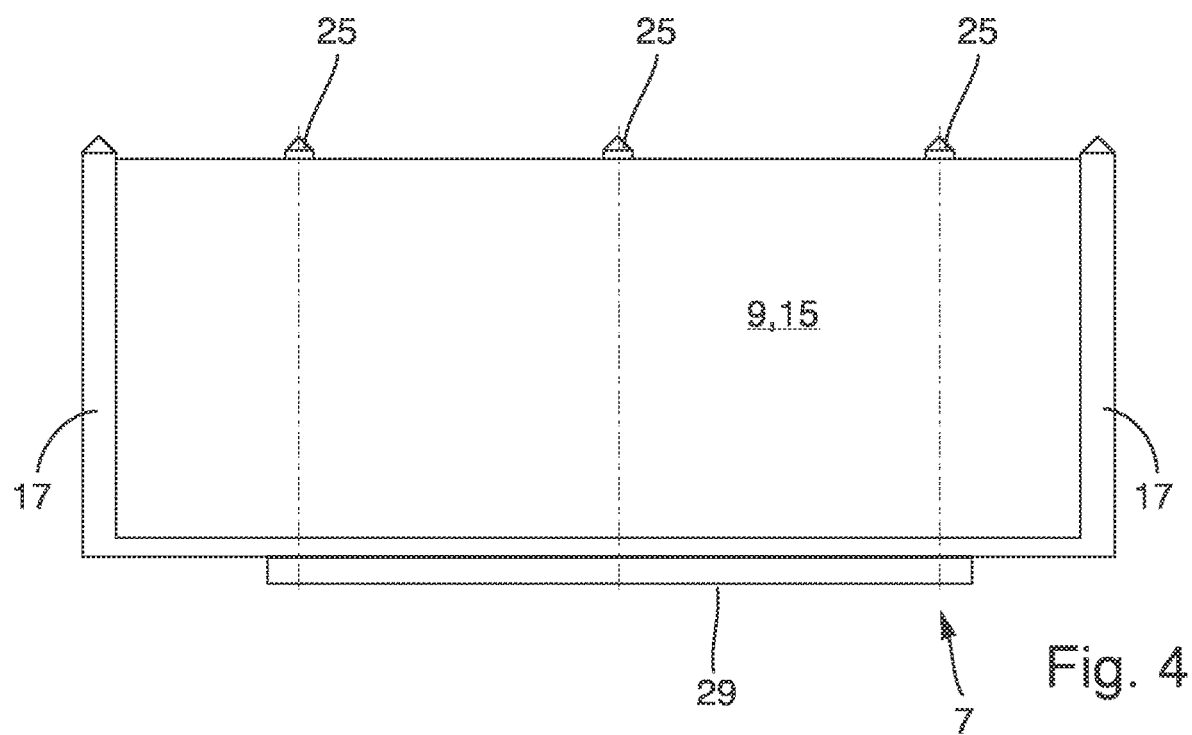
FIG. 4 shows a top view of the freight carrier in FIG. 2, wherein the bolts are in an extended position.

FIGS. 2 through 4 reveal a lateral sectional view and top views of an example embodiment of a freight carrier 7 of a system according to the disclosure herein, wherein the example embodiment of a freight carrier 7 has a base element 9, wherein the base element has a supporting surface 11 which is provided to rest on the floor surface 13 of the passenger cabin 1 whenever the freight carrier 7 is arranged at the location provided for it in the passenger cabin 1 of the aircraft. Furthermore, the base element 9 of the freight carrier 7 has a main surface 15 which is opposite the supporting surface 11 and is provided for freight elements, for example luggage, but also other freight, to be able to be accommodated thereon. In this case, the freight carrier 7, as shown in FIGS. 2 through 4, can have a frame 17 and optionally also fixed walls which surround a receiving space. However, it is just as readily possible for the freight carrier 7 to have only the base element 9, on which the freight elements can then be arranged, and not to have a frame and/or wall. A freight carrier 7 according to the disclosure herein therefore does not necessarily also comprise a wall surrounding a receiving space.

As can furthermore be gathered from FIGS. 2 through 4, the example embodiment of a freight carrier 7 that is shown in these figures has structure in order to move the freight carrier 7 over the floor surface of the interior, or of the passenger cabin 1, of the aircraft, wherein the structure is provided in the supporting surface 11 and, in the present example embodiment, are formed by wheels 19, wherein the wheels can be moved between a first wheel position, in which the wheels spring back behind the supporting surface 11 and therefore do not protrude at all beyond the latter here, and a second wheel position, which is shown in FIG. 2.

In addition, the base element 9 of the freight carrier 7 has a front edge 21 and a rear edge 23 opposite the latter, wherein, in the example embodiment described here, the base element 9 is rectangular, and therefore the front edge 21 and the rear edge 23 run parallel to each other.

In the region of the front edge 21 of the freight carrier 7, bolts 25 are provided which form front engagement elements and, in the example embodiment of a freight carrier 7 of a system according to the disclosure herein that is illustrated in FIGS. 2 to 4, can be moved between a retracted position (see FIG. 3) and an extended position (see FIGS. 2 and 4). For this purpose, the freight carrier 7 has an actuating device which comprises a plurality of actuating rods 27 which run parallel to one another and extend between the front edge 21 and the rear edge 23. In addition, in this example embodiment, the actuating device has an actuating element in the form of an actuating arm 29 which is pivotable about a horizontal pivot axis and which can be moved between a first position (see FIGS. 2 and 4) and a second position (see FIG. 3), wherein, in the example embodiment described here, the actuating arm 29 is held pivotably on the base element 9. During a pivoting movement of the actuating arm 29 from the first position into the second position, the actuating rods 27 are displaced inside the base element 9, wherein this movement runs in the plane of the supporting surface 11. Since the bolts 25, the free ends of which, as illustrated in FIGS. 2 through 4, are conical, are provided at the free ends of the actuating rods 27, the bolts, during the movement of the actuating arm from the first position thereof into the second position thereof, are brought out of the retracted position, in which they protrude only to a slight extent, if at all, over the front edge 21, into the extended position, in which, in comparison to the retracted position, they protrude to a relatively large extent over the front edge 21.

In addition, the actuating rods 27 are provided with first engagement surfaces 31 which run at an inclination to the supporting surface 11 and which engage with second engagement surfaces 35, which are provided on holders 33 for the wheels 19, and therefore, as is apparent from FIG. 2, a displacement movement of the actuating rods 27 leads to a movement of the holders 33 perpendicular to the supporting surface 11. Therefore, during the movement of the actuating rod 27, the wheels 19 are moved between the first wheel position and the second wheel position. In particular, the configuration of the actuating device with the actuating rods 27 and the first and second engagement surfaces 31, 35 and also the actuating arm 29 is configured in such a manner that, whenever the actuating arm 29 is in the first position, in which the bolts 25 are in the retracted position, the wheels 19 are in the second wheel position, in which they protrude over the supporting surface 11. If the actuating arm 29 is brought into the second position, the bolts 25 are moved into the extended position while, at the same time, the wheels 19 are brought into the first wheel position, in which they no longer protrude over the supporting surface 11, and therefore the freight carrier 7 or the base element 9 then rests on the floor surface 13.

The actuating device is therefore configured in such a manner that the front engagement elements in the form of the bolts 25 are moved parallel to the wheels 19, wherein, for this purpose, only one actuating element, or optionally a plurality of common actuating elements, here in the form of the actuating arm 29, have to be moved.

FIGS. 5 to 10 show freight carriers 7 which are constructed entirely similarly to those from FIGS. 2 to 4 and differ therefrom only in that a frame 17 is not provided above the main surface 15 and in that here, instead of only one actuating arm, two actuating arms 29' are provided which have to be pivoted about vertical axes in order to move the actuating rods 27 which, in turn, are coupled to the bolts 25 and to the holders 33 for the wheels 19.

Figure 10A:
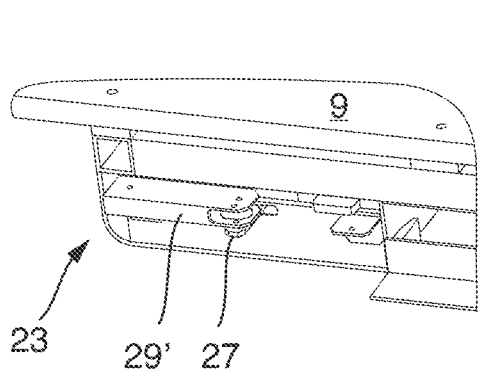
FIGS. 10a and 10b show details of the freight carrier of the example embodiment from FIGS. 5 to 9.
Figure 10B:
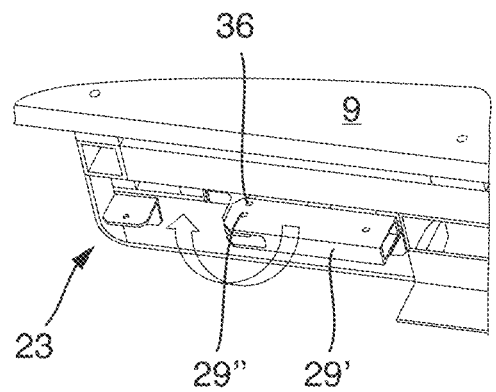

As is shown in particular in FIGS. 10a and 10b, actuating arms 29' are attached to the rear edge 23 of the base element 9 of the example embodiment so as to be pivotable about vertical axes 29", and therefore the actuating arms 29' can be pivoted between the positions shown in FIG. 10a and in FIG. 10b. The actuating arms 29' are coupled with the aid of pins 36 to the actuating rods 27 which firstly move the bolts 25 between the retracted and the extended position and secondly move the wheels 19 between the first and the second wheel position. If the actuating arms 29' are in the outwardly pivoted, first position shown in FIG. 10a, the bolts 25 are in the retracted position and the wheels 19 are in the second wheel position, in which they protrude over the supporting surface 11 of the base element 9. If, however, the actuating arms 29' are pivoted into the position shown in FIGS. 5 and 10b, the actuating rods 27 are displaced by the coupling via the pins 36 in such a manner that the bolts 25 are brought into the extended position and the wheels 19 are displaced into the first wheel position, in which they do not protrude over the supporting surface 11 of the base element 9.

In order to fix the freight carriers 7 with their supporting surfaces 11 to the floor surface 13 of the interior, and in particular of the passenger cabin 1, of the aircraft, the example embodiments of systems according to the disclosure herein have a front catch element 37 (see FIGS. 7 and 8) and a rear catch element 39 (see FIGS. 5 and 6), wherein the rear catch element 39 has rear engagement devices in the form of rear protrusions 41 which are configured to extend into rear receiving openings 43 forming rear engagement elements. The rear protrusions 41 and the rear receiving openings 43 are dimensioned in such a manner that, whenever the rear protrusions 41 extend into the rear receiving openings 43 and therefore engage with one another, a movement of the rear catch element 39 relative to the base element 9 parallel to the plane of the supporting surface 11 and perpendicularly to the plane towards the supporting surface 11 is prevented. If the rear protrusions 41 engage with the receiving openings 43, the rear catch element 39 can no longer be displaced parallel to the plane of the supporting surface 11 in relation to the base element 9 because the distance between the rear protrusions 41 corresponds to the width of the receiving openings 43. In addition, the rear protrusions 41 rest on the base of the receiving openings 43, and therefore the rear catch element 39 can no longer be moved towards the supporting surface 11. If both the base element 9 and the rear catch element 39 rest on the floor surface 13 of the interior and the rear protrusions 41 extend into the rear receiving openings 43, the previously described configuration of rear protrusions 41 and rear receiving openings 43 and therefore the rear engagement elements and engagement devices means that the base element 9, and therefore the freight carrier 7, cannot be moved away from the floor surface 13, but rather is held fixed thereon.

Figure 5:
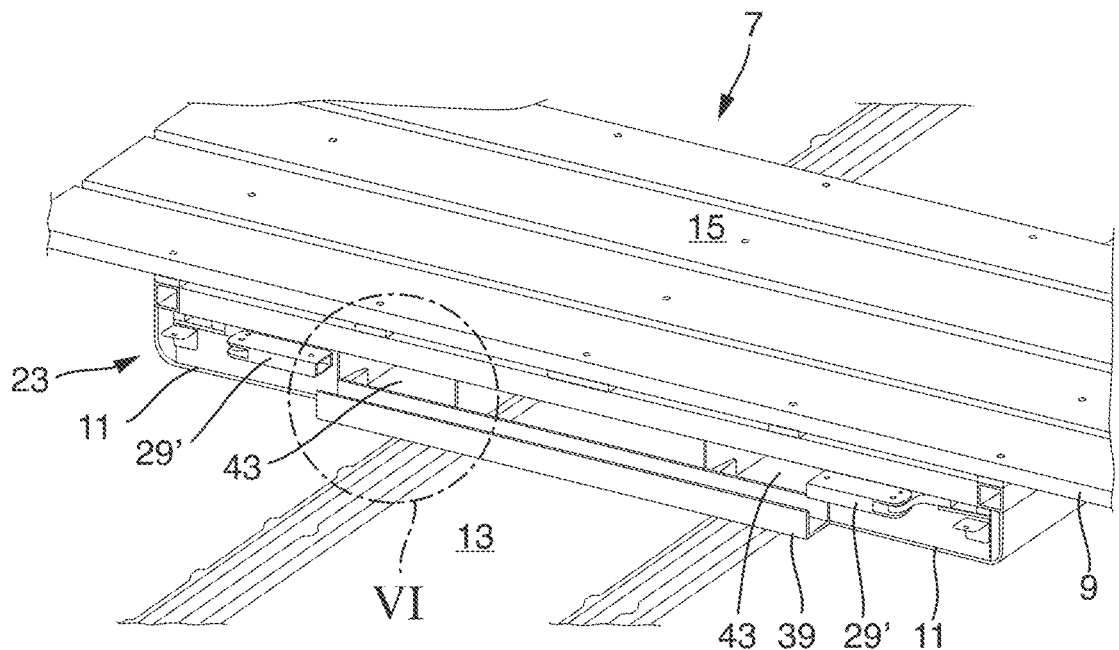
FIG. 5 shows a perspective illustration of a freight carrier and of a rear catch element according to an example embodiment of the disclosure herein.
Figure 6:
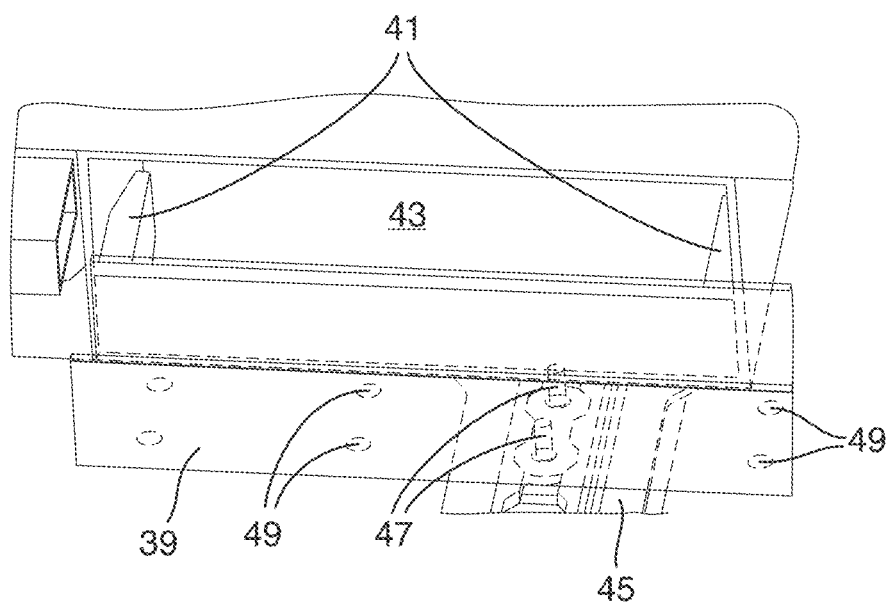
FIG. 6 shows a detail from FIG. 5.

As is revealed in FIGS. 5 and 6 and also 9, the rear catch elements 39 are fastened to rails 45, wherein the rails 45 extend parallel to one another in the floor surface 13 of the interior, and in particular in the passenger cabin 1 of the aircraft. These rails 45 can be provided in particular to hold rows of seats on the floor surface 13 and to transmit the loads resulting therefrom into the structure of the aircraft. As can be seen in particular from FIG. 9, locking elements in the form of locking bolts 47 can be arranged in the rails 45, which locking elements are held along the longitudinal direction of the rails 45 so as to be non-displaceable therein and also cannot move out of the rails 45 perpendicular to the plane of the floor surface 13.

These locking bolts 47 are received in bores 49, forming floor engagement devices, in the rear catch element 39 and secured in relation to the rear catch element 39 by a nut, not illustrated, and therefore the catch element cannot move away from the floor surface 13.

As can be gathered from FIGS. 5 and 6, the rear catch element 39 according to the disclosure herein has a multiplicity of bores 49 which, when the rear catch element 39 is arranged on the rear edge 23 of the base element 9, are arranged along the rear edge 23. This makes it possible for the rear catch element 39 to be able to be fastened to the rails 45 in different positions relative thereto, wherein these positions are offset in the transverse direction with respect to the rails 45. In addition, the multiplicity of bores 49 in the rear catch element 39 make it possible for the latter to be able to be fastened to rails 45 at different distances from one another.

Figure 7:
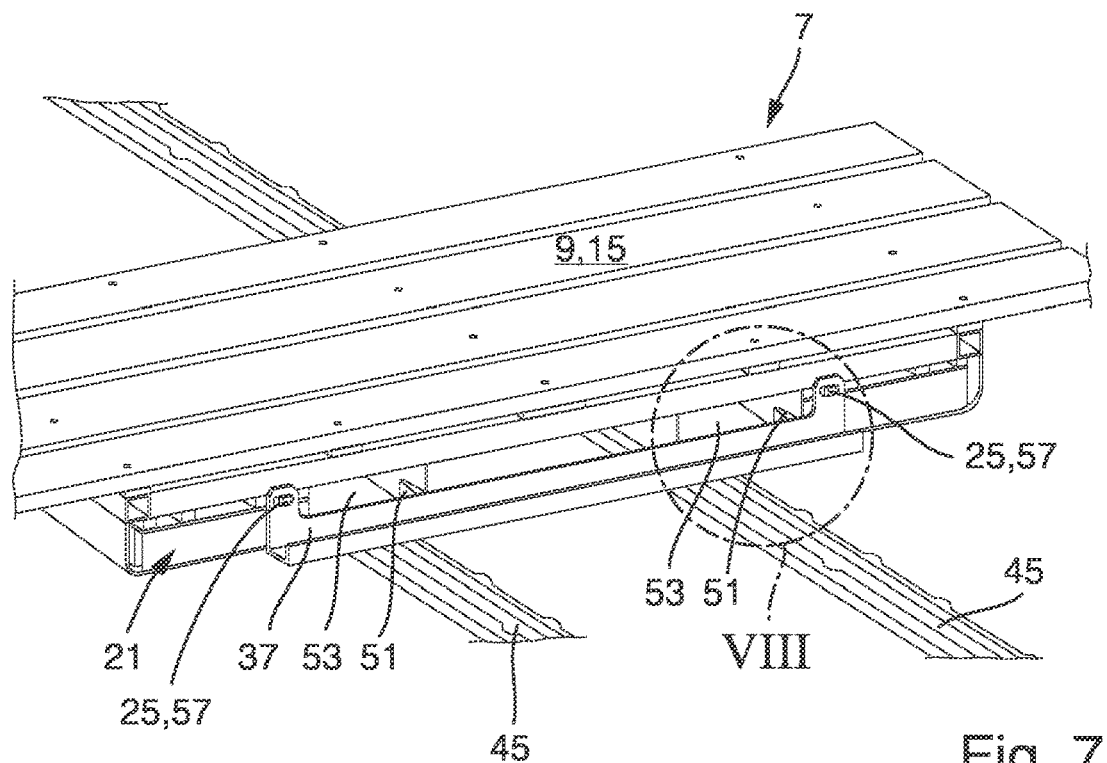
FIG. 7 shows a perspective illustration of the freight carrier and of a front catch element according to the example embodiment shown in FIGS. 5 and 6.
Figure 8:
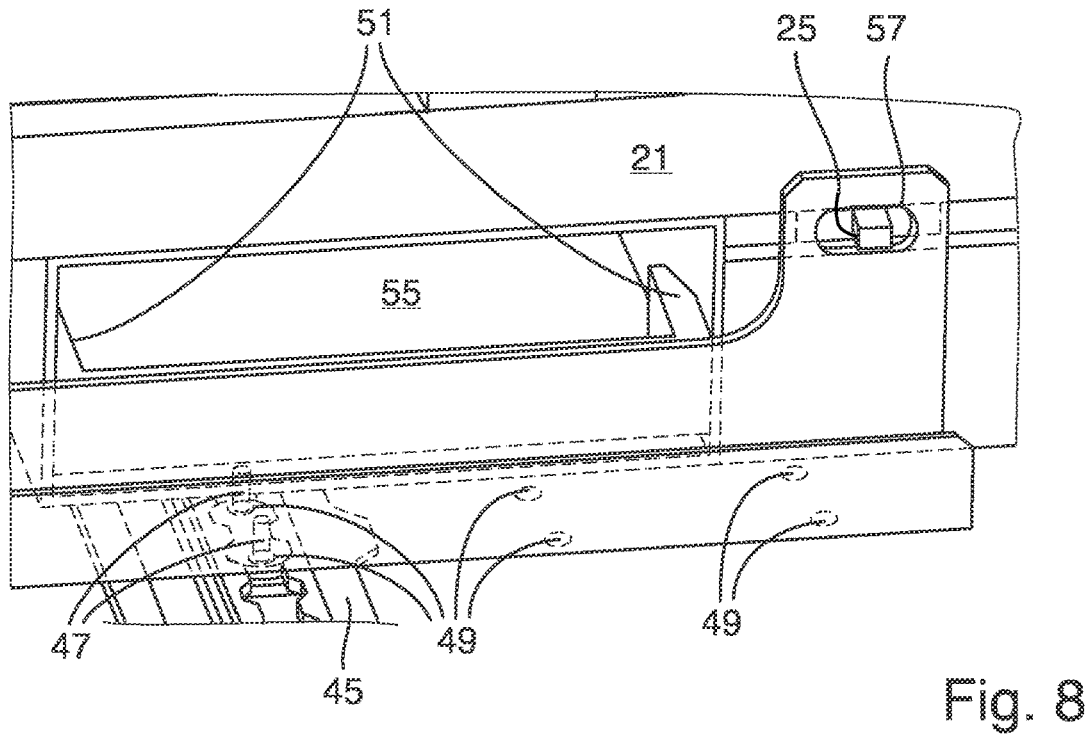
FIG. 8 shows a detail from FIG. 7.
Figure 9:
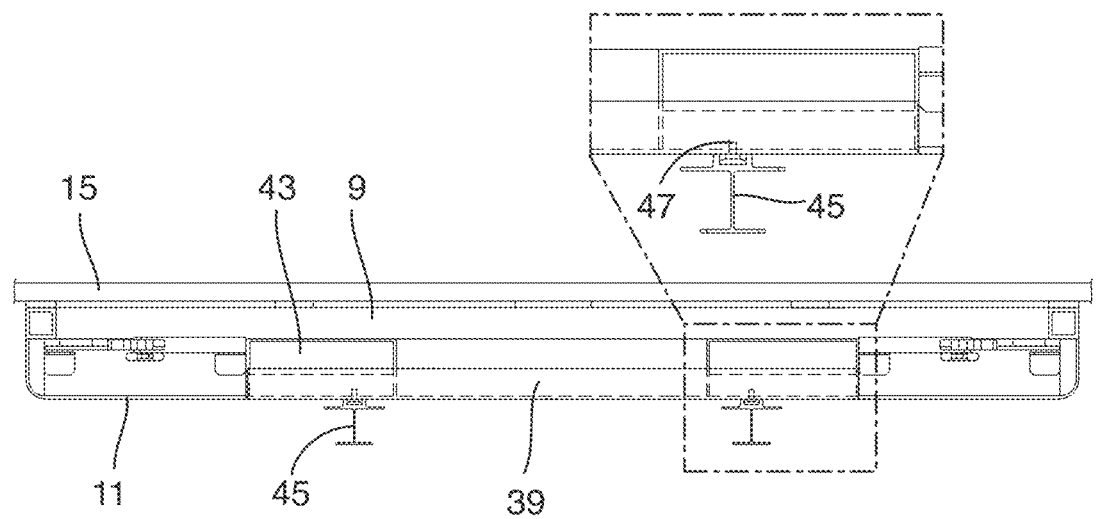
FIG. 9 shows a sectional view from the rear of the freight carrier and the rear catch element according to FIG. 5.

It can furthermore be seen from FIGS. 7 and 8 that the freight carrier 7 shown in these figures is fastened at its front edge 21 to the rails 45 in the floor surface 13 with the aid of a front catch element 37. The front catch element 37 extends along the front edge 21 and, similarly to the rear catch element 39, has front protrusions 51 which extend into front receiving openings 53 in the front edge 21 of the base element 9. In contrast to the rear receiving openings 43 and the rear protrusions 41 which enter into engagement at the rear edge 23 of the base element, it is the case, however, at the front edge 21 that, as FIG. 8 in particular reveals, the front protrusions 51 do not rest on the base 55 of the front receiving openings 53 when both the base element 9 and the front catch element 37 rest on the floor surface 13; instead, in this case, there is a gap between the lower side of the front protrusions 51 and the base 55 such that the base element 9 can already be brought into engagement with the front protrusions 51 when it is spaced apart from the floor surface 13 because of the wheels 19 still being extended. However, the front protrusions 51 are spaced apart from one another in such a manner that a displacement of the base element 9 parallel to the direction of extent of the front catch element 37 and therefore parallel to the supporting surface is not possible.

Furthermore, it can be seen from FIGS. 7 and 8 that the bolts 25 are provided on the front edge 21 of the base element, which bolts, whenever the actuating elements 29' have been brought into the position shown in FIGS. 5 and 10a, extend beyond the front edge 21 and then engage with front openings 57 which are provided on the front catch element 37.

As can furthermore be seen from FIG. 8, the front catch element 37 also has bores 49 which form floor engagement devices and in which locking bolts 47 which extend upwards away from the rails 45 can be accommodated, wherein the locking bolts 47 are then secured, for example, by nuts such that the front catch element 37 can no longer be lifted off from the floor surface 13 or the rails 45. In addition, it can also be gathered from FIG. 8 that a multiplicity of bores 49 are provided along the front catch element 37, as also in the case of the rear catch element 39, and therefore the front catch element 37 can also be arranged in different positions relative to the rails 45. In addition, it is thereby possible for the front catch element 37 to also be able to be used at different distances of the rails 45.

If the front catch element 37 is fastened to the rails 45 by the locking bolts 47 and further nuts such that it can no longer be lifted off from the rails 45, and if furthermore the bolts 25 engage with the front openings 57, a movement of the front catch element 37 relative to the base element 9 parallel to the plane of the supporting surface 11 and perpendicular to the plane towards the supporting surface 11 is prevented. This is because, by the engagement of the bolts 25 with the front openings 57, it is specifically prevented that the front catch element 37 can be displaced along the front edge 21 both in the vertical and in the horizontal direction. This in turn leads to the fact that, when the bolts 25 engage with the front openings 57, forces which lift off the base element 9 and therefore the freight carrier 7 from the floor surface 13 are introduced via the rails 45 into the structure of the aircraft.

Figure 11:
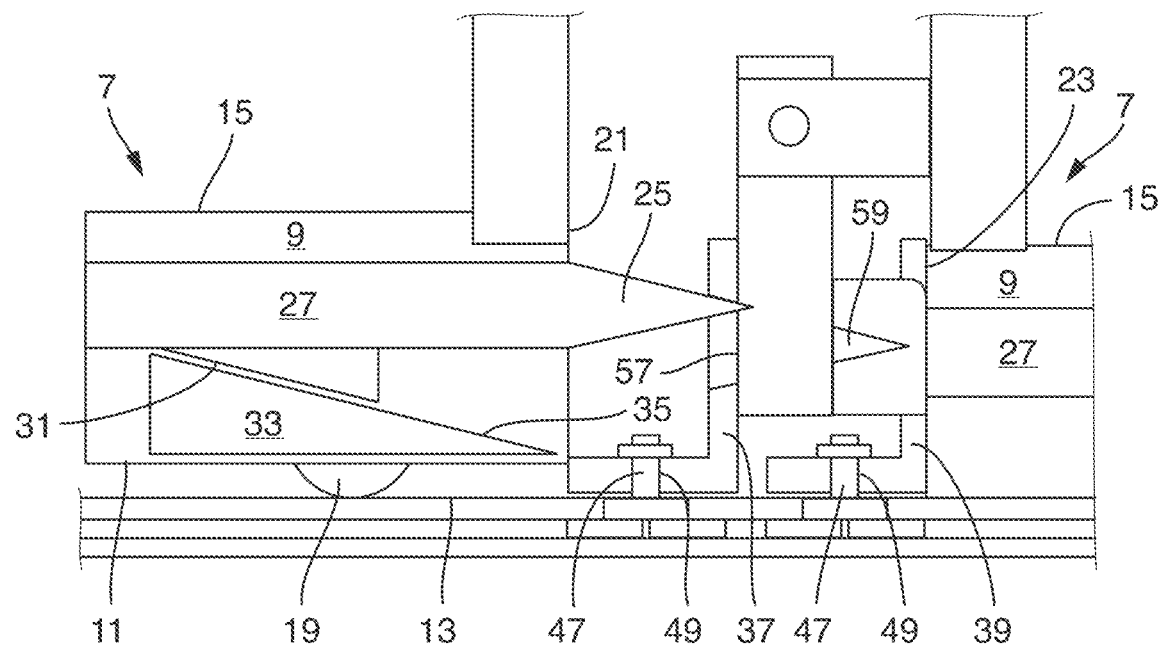
FIG. 11 shows a lateral sectional illustration of two adjacent freight carriers and of a front and a rear catch element according to an example embodiment of the disclosure herein, wherein bolts of the one freight carrier are partially accommodated in the front catch element.
Figure 12:
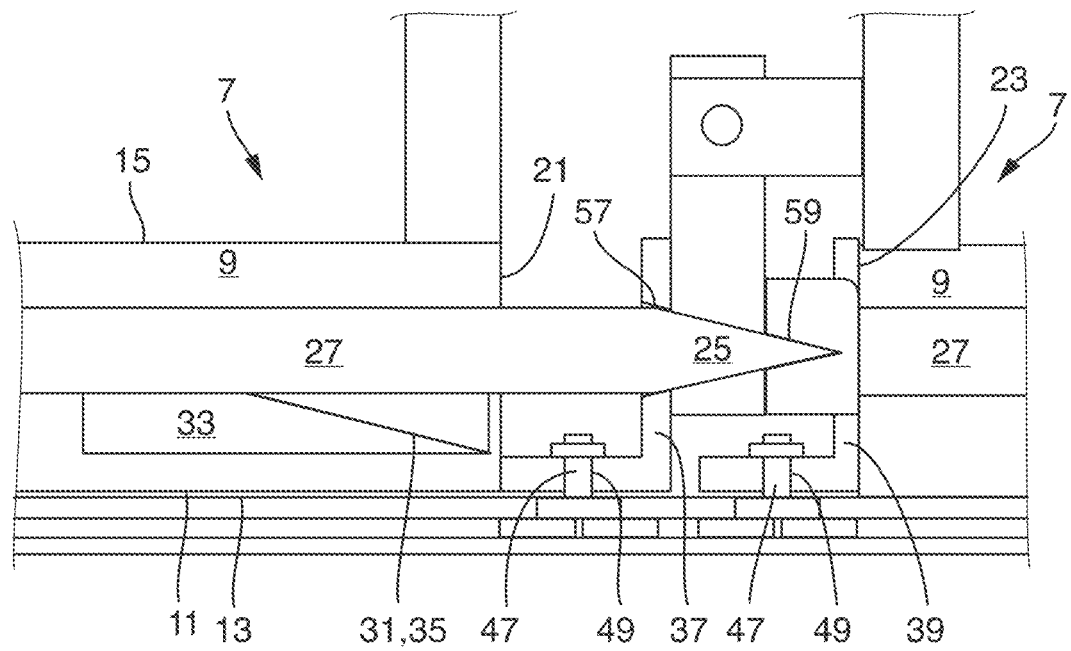
FIG. 12 shows a lateral sectional illustration similar to FIG. 11, wherein the bolts of the one freight carrier are completely accommodated in the front and the rear catch element between two freight carriers.

FIGS. 11 and 12 show lateral sectional illustrations of a further example embodiment of a system consisting of freight carriers 7 with base elements 9 and front and rear catch elements 37, 39. As already described in conjunction with the example embodiment from FIGS. 2 to 4, the freight carriers 7 also have base elements 9 here in which actuating rods 27 are guided displaceably, such that they can be displaced with the aid of an actuating arm which is not shown in FIGS. 11 and 12 and which can take up a first position and a second position, wherein, in the first position, a bolt 25 connected to the actuating rod 27 and having a conical end is in a retracted position (see FIG. 11), in which it protrudes only to a small extent over the front edge 21 of the base element 9. If the actuating arm 29 is brought into the second position, the bolt 25 protrudes, because of the movement of the actuating rod 27, to a greater extent over the front edge 21 of the base element 9 (see FIG. 12).

Also in this example embodiment, the actuating rod 27 in the base element 9 of the freight carriers 7 is provided with a first engagement surface 31 which runs in an inclined manner and engages with a second engagement surface 35 on the holder 33, on which, in turn, the wheels 19 are held. The wheels 19 can also be moved here between a first wheel position and a second wheel position, wherein, in the first wheel position (see FIG. 12), the wheels 19 do not protrude over the supporting surface 11 of the base elements 9. However, in the second wheel position (see FIG. 11), the wheels 19 protrude over the supporting surface 11 such that the freight carriers can be moved in a simple manner over a floor surface 13. The actuating rods 27 and the holders 33 are also coupled here in such a manner that, whenever the actuating arm 29, not illustrated, is in the first position, the bolts 25 are in the retracted position and the wheels 19 are in the second (extended) wheel position, while, whenever the actuating arm 29 is in the second position, the bolts 25 are in the extended position and the wheels 19 are in the first (retracted) wheel position.

As can furthermore be gathered from FIGS. 11 and 12, a front catch element 37 and a rear catch element 39 can be arranged between two freight carriers 7, which are arranged on the floor surface 13 of the interior of the aircraft, and in particular of the passenger cabin thereof, wherein the front catch element 37 extends along the front edge 21 of the one freight carrier 7, while the rear catch element 39 runs along the rear edge 23 of the second freight carrier 7, which is arranged in front of the one freight carrier 7.

The catch elements 37, 39 are also fixedly connected here to rails in the floor surface 13 of the interior with the aid of locking bolts 47, which extend through bores 49, forming floor engagement devices, in the catch elements 37, 39 and are secured by nuts, wherein these rails are also directly connected here to the structure of the aircraft. Also in this example embodiment, in the catch element 37, 39, a multiplicity of bores 49 are provided along the running direction and the catch elements 37, 39 and therefore along the rear edge 23 and the front edge 21, and therefore the catch elements 37, 39 can be attached in different positions relative to the rails.

Furthermore, it can be gathered from FIGS. 11 and 12 that the front catch elements 37 have front openings 57 in which the bolts 25 can be accommodated. The front openings 57 are designed here as through openings such that the bolts 25, when they are in the extended position (see FIG. 12), can extend through them and are additionally received by rear openings 59 in the rear catch element 39 arranged directly adjacent to the front catch element 37.

As a result, the bolts 25 and therefore the front engagement elements provided on the base element 9 of the one freight carrier 7 pass into engagement both with the front catch element 37 and with the rear catch element 39 arranged adjacent thereto. As a result, the front edge 21 of the freight carrier 7, which is illustrated on the left in FIGS. 11 and 12, is therefore secured by two catch elements 37, 39, and therefore the edge is held redundantly on the structure of the aircraft.

With the previously described example embodiments of a system consisting of freight carriers 7 and front and rear catch elements 37, 39, it is possible to hold the freight carriers 7 in a simple manner on the floor surface 13 of the interior, and in particular of the passenger cabin 1 of an aircraft, in such a manner that, firstly, the forces acting on the freight carriers are introduced into the structure of the aircraft and, secondly, the outlay on the fastening is comparatively small. Furthermore, with just a small outlay, a passenger cabin 1, in which rows of seats are fastened to rails 45 in the floor surface, can be set up for use with the system according to the disclosure herein. All that is required for this purpose is to remove the rows of seats in the region in which the freight carriers 7 are intended to be accommodated.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Passenger cabin
3 Hold
5 Cabin door
7 Freight carrier
9 Base element
11 Supporting surface
13 Floor surface
15 Main surface
17 Frame
19 Wheels
21 Front edge
23 Rear edge
25 Bolt
27 Actuating rod
29, 29' Actuating arm
29" Vertical axis
31 First engagement surface
33 Holder
35 Second engagement surface
36 Pin
37 Front catch element
39 Rear catch element
41 Rear protrusions
43 Rear receiving openings
45 Rail
47 Locking bolts
49 Bore
5
51 Front protrusion
53 Front receiving opening
55 Base
57 Front opening
59 Rear openings

The invention claimed is:

1. A system comprising:
at least one freight carrier;
at least one front catch element; and
at least one rear catch element;
wherein the at least one freight carrier has a base element which has a supporting surface, which is configured to rest on a floor surface in an interior of an aircraft on a floor surface of a passenger cabin of the aircraft, and which has a front edge and a rear edge opposite the front edge;
wherein the supporting surface is configured to move the freight carrier over the floor surface of the passenger cabin;
wherein the base element has a main surface, which is on the base element such that the main surface faces away from the supporting surface, and which is configured such that freight elements can be accommodated thereon;
wherein the front edge of the base element comprises bolts;
wherein the rear edge of the base element comprises rear receiving openings;
wherein the at least one front catch element is configured to extend along the front edge of the base element and has front bores, which are configured to engage with locking bolts in rails in the floor surface of the interior of the passenger cabin, such that a movement of the front catch element in a plane of the floor surface and perpendicular thereto is prevented;
wherein the at least one front catch element has front openings, which are configured to engage with the bolts on the front edge of the base element, such that a movement of the front catch element relative to the base element parallel to a plane of the supporting surface and perpendicular to the plane towards the supporting surface is prevented;
wherein the at least one rear catch element is configured to extend along the rear edge of the base element and has rear bores, which are configured to engage with locking bolts in rails in the floor surface of the interior of the passenger cabin, such that a movement of the rear catch element in the plane of the floor surface and perpendicular thereto is prevented; and
wherein the at least one rear catch element has rear protrusions, which are configured to engage with the rear receiving openings on the rear edge of the base element, such that a movement of the at least one rear catch element relative to the base element parallel to the plane of the supporting surface and perpendicular to the plane towards the supporting surface is prevented.

2. The system according to claim 1, wherein;
the bolts are displaceable parallel to the plane of the supporting surface in relation to the base element and perpendicular to the front edge, such that the bolts can take up a retracted position and an extended position;
the bolts protrude further over the front edge in the extended position than in the retracted position; and
the front openings are configured to receive the bolts.

3. The system according to claim 2, wherein the bolts, when in the extended position, protrude over the front edge to an extent that the bolts extend through the front catch element and through the front openings of the front catch element, such that the bolts protrude over the front catch element when the front catch element is along the front edge of the freight carrier.

4. The system according to claim 3, wherein the rear openings are configured to receive the bolts when the rear catch element is along the front catch element, on a side of the front catch element which faces away from the freight carrier.

5. The system according to claim 2, wherein a free end of the bolts is conical.

6. The system according to claim 2, wherein:
the bolts are coupled to an actuating device, which is configured to displace the bolts between the retracted position and the extended position;

the actuating device has an actuating element, which is movable between a first position and a second position; and the actuating device is configured such that, when the actuating element is in the first position, the bolts are in the retracted position and, when the actuating element is in the second position, the bolts are in the extended position.

7. The system according to claim 1, wherein;
to move the freight carrier over the floor surface, wheels are movable in a direction transversely and/or perpendicularly, with respect to the supporting surface, between a first wheel position and a second wheel position;

the wheels do not protrude over the supporting surface when in the first wheel position; and the wheels protrude over the supporting surface when in the second wheel position.

8. The system according to claim 7, wherein:
the bolts are coupled to an actuating device, which is configured to displace front engagement elements between a retracted position and an extended position;

the actuating device has an actuating element, which is movable between a first position and a second position;

the actuating device is configured such that, when the actuating element is in the first position, the bolts are in the retracted position and, when the actuating element is in the second position, the bolts are in the extended position;

the actuating device is furthermore coupled to the wheels, such that the actuating device moves the wheels between the first wheel position and the second wheel position; and the actuating device is configured such that, when the actuating element is in the first position, the wheels are in the second wheel position and when the actuating element is in the second position, the wheels are in the first wheel position.

9. The system according to claim 1, wherein:
the rear receiving openings comprise two rear receiving openings that extend perpendicular to the rear edge and parallel to the plane of the supporting surface, and the rear protrusions are configured to be received in the two receiving openings.

10. The system according to claim 9, wherein the two rear receiving openings are dimensioned to receive forks of a forklift truck.

11. The system according to claim 1, wherein the front bores and the rear bores are configured to engage with the locking bolts, which are respectively arranged in at least two rails that extend parallel to one another in the floor surface.

12. The system according to claim 11, wherein:
the locking bolts protrude over the floor surface; and the front bores and the rear bores are configured for receiving the locking bolts therein.

13. The system according to claim 1, wherein:
the front bores are configured such that the front catch element is fastenable to the rails in the floor surface of the interior of the passenger cabin; and the bores are configure d such that the rear catch element is fastenable to the rails in the floor surface of the interior of the passenger cabin, in a different position transversely with respect to the front catch element.

14. The system according to claim 1, wherein:
the front bores comprise a multiplicity of bores that are formed along a direction which runs parallel to the front edge of the base element when the bolts on the front edge of the base element are in engagement with the front openings and, therefore, the locking bolts, which are in the rails, can engage with the front bores of the front catch element; and the rear bores comprise a multiplicity of bores that are formed along a direction which runs parallel to the rear edge of the base element when the rear receiving openings on the rear edge of the base element are in engagement with the rear protrusions and, therefore, the locking bolts, which are in the rails, can engage with the rear bores of the rear catch element.

* * * * *